(12) United States Patent
Walter et al.

(10) Patent No.: US 8,613,965 B2
(45) Date of Patent: Dec. 24, 2013

(54) CALCIUM-ENRICHED FOOD PRODUCT

(75) Inventors: Mary A. Walter, Fair Oaks Ranch, TX (US); Nick N. Davis, San Antonio, TX (US)

(73) Assignees: Mission Phamacal Co., San Antonio, TX (US); Sterling Foods, Ltd., San Antonio, TX (US)

( * ) Notice: Subject to any disclaimer, the term of this patent is extended or adjusted under 35 U.S.C. 154(b) by 169 days.

(21) Appl. No.: 12/372,108

(22) Filed: Feb. 17, 2009

(65) Prior Publication Data

US 2009/0155432 A1    Jun. 18, 2009

Related U.S. Application Data

(62) Division of application No. 11/329,905, filed on Jan. 11, 2006, now Pat. No. 7,968,130.

(51) Int. Cl.
| | | |
|---|---|---|
| *A23L 1/30* | (2006.01) | |
| *A21D 6/00* | (2006.01) | |
| *A21D 10/00* | (2006.01) | |
| *A21D 13/00* | (2006.01) | |
| *A23C 3/00* | (2006.01) | |
| *A21D 2/16* | (2006.01) | |

(52) U.S. Cl.
USPC ............ 426/73; 426/496; 426/549; 426/653; 426/72; 426/523

(58) Field of Classification Search
USPC .................. 426/73, 653, 523, 72, 496, 549
See application file for complete search history.

(56) References Cited

U.S. PATENT DOCUMENTS

| | | | | |
|---|---|---|---|---|
| 2,138,241 A | * | 11/1938 | Koch et al. | 229/117.26 |
| 2,495,403 A | * | 1/1950 | Bernards et al. | 426/303 |
| 2,970,915 A | * | 2/1961 | Ferrari | 426/22 |
| 3,084,048 A | * | 4/1963 | Renner | 426/22 |
| 3,465,873 A | * | 9/1969 | Munz | 206/205 |
| 3,784,714 A | * | 1/1974 | McReynolds et al. | 426/658 |
| 4,159,348 A | * | 6/1979 | Dogliotti | 426/23 |
| 4,859,473 A | * | 8/1989 | Arciszewski et al. | 426/19 |
| 4,871,550 A | * | 10/1989 | Millman | 424/601 |

(Continued)

FOREIGN PATENT DOCUMENTS

| | | |
|---|---|---|
| AU | 775206 B2 | 7/2004 |
| CN | 1276165 A | 12/2000 |

(Continued)

OTHER PUBLICATIONS

Ask a Scientist. Available online at www.newton.dep.anl.gov since Oct. 18, 2000.*

(Continued)

*Primary Examiner* — Rena Dye
*Assistant Examiner* — Assaf Zilbering
(74) *Attorney, Agent, or Firm* — Fulbright & Jaworski LLP

(57) ABSTRACT

The present invention is directed to a calcium-enriched chewable baked food product in which at least one piece of the food product provides the recommended daily DRI of elemental calcium. The calcium-enriched baked food product has a mouth feel, texture and taste substantially similar to a non-calcium-enriched baked food product. The food product also provides Vitamin $D_3$ in a range of 100-2400 IU and optionally may be enrobed with a flavored coating. The present invention is also directed to a method for producing the calcium-enriched food product.

19 Claims, 3 Drawing Sheets

(56) References Cited

U.S. PATENT DOCUMENTS

| | | | |
|---|---|---|---|
| 5,219,602 A * | 6/1993 | Saleeb et al. | 426/250 |
| 5,260,082 A * | 11/1993 | delValle et al. | 426/549 |
| 5,514,387 A | 5/1996 | Zimmerman et al. | |
| 5,804,243 A * | 9/1998 | Loh et al. | 426/552 |
| 6,039,978 A | 3/2000 | Bangs et al. | |
| 6,086,927 A | 7/2000 | Frielich et al. | |
| 6,126,982 A | 10/2000 | Maldonado | |
| 6,143,335 A * | 11/2000 | McKenzie | 426/72 |
| 6,210,686 B1 | 4/2001 | Bell et al. | |
| 6,210,720 B1 * | 4/2001 | Leusner et al. | 426/74 |
| 6,495,191 B1 | 12/2002 | Maldonado | |
| 6,569,445 B2 | 5/2003 | Manning et al. | |
| 6,716,454 B2 | 4/2004 | Meignant et al. | |
| 6,723,358 B1 | 4/2004 | Van Lengerich | |
| 7,147,882 B2 * | 12/2006 | Girsh | 426/312 |
| 2002/0142081 A1 * | 10/2002 | Ream et al. | 426/396 |
| 2003/0054088 A1 * | 3/2003 | Jones | 426/656 |
| 2004/0047962 A1 | 3/2004 | Takaichi et al. | |
| 2005/0069608 A1 | 3/2005 | Hendricks | |
| 2005/0100622 A1 * | 5/2005 | Nair et al. | 424/777 |
| 2005/0170049 A1 | 8/2005 | Dibble et al. | |
| 2005/0238760 A1 * | 10/2005 | Ballman et al. | 426/74 |

FOREIGN PATENT DOCUMENTS

| | | |
|---|---|---|
| JP | 08-126479 | 5/1996 |
| JP | 2000-135060 A | 5/2000 |
| WO | WO-96/18387 A1 | 6/1996 |
| WO | WO-99/26491 | 6/1999 |
| WO | 0045650 A1 | 8/2000 |
| WO | WO-03/055500 A1 | 7/2003 |
| WO | WO-03/059082 A1 | 7/2003 |
| WO | WO-2005/117829 A2 | 12/2005 |

OTHER PUBLICATIONS

Gerstner, Calcium Citrate in Fortified-Food Applications. Available online at www.jungbunzlauer.com on Nov. 23, 2004.*

Jost Chemica—Calcium Citrate. Available online at www.jostchemical.com on Oct. 23, 2004.*

Gilliand, "Chocolate Glazed Doughnuts Recipe", Mar. 31, 2998. http://www.bigoven.com/67855-Chocolate-Glazed-Doughnuts-recipe.html.

Deluca et al., "The vitamin D story: a collaborative effort of basic science and clinical medicine," FASEB J. Mar. 1, 1988; 2(3):224-236.

www.caltrate.com/ourproducts/caltrate-600dsoftchews#.

Health Council of the Netherlands, "Executive Summary", Health Council of the Netherlands. Dietary reference intakes: calcium, vitamin D, thiamin, riboflavin, niacin, pantothenic acid, and biotin. The Hague: Health Council of the Netherlands, 2000, pp. 11-12, Publication No. 2000/12.

* cited by examiner

CALCIUM-ENRICHED FOOD PRODUCT

CROSS-REFERENCE TO RELATED APPLICATIONS

This application is a divisional of prior U.S. application Ser. No. 11/329,905, filed Jan. 11, 2006 now U.S. Pat. No. 7,968,130.

TECHNICAL FIELD

The present invention is directed to calcium-enriched food products and more particularly to a chewable calcium dietary supplement.

BACKGROUND OF THE INVENTION

Calcium plays an important role in blood coagulation, nerve transmission, muscle contraction, and heart function. Protection against high blood pressure, colon cancer, and the degenerative bone disease known as osteoporosis have been attributed to calcium. Calcium is required in the diet in relatively large quantities. The Food and Nutrition Board has established a Dietary Reference Intake (DRI) for calcium. A daily intake of about 1000 mg of calcium meets most peoples needs for general health especially bone health. For older adults and people with osteoporosis many clinicians recommend a daily intake of about 1200 mg of calcium. Calcium requirements in adolescent children and lactating and pregnant women are 1000-1300 mg daily. The published DRIs list the recommended DRI by age. The daily adult upper limit "UL" of calcium is 2500 mg. See www.nal.usda.gov. However, the average calcium intake may be only about one-third to one-half of the recommended daily dosing. Thus, dietary supplementation of calcium is beneficial. If dietary sources of calcium do not provide sufficient amounts of calcium to the blood, calcium is depleted from the bones to compensate for the insufficient amounts. Age related bone loss and fracture rates in patients with osteoporosis may be reduced with high dietary intake of calcium. Calcium absorption efficiency decreases with increasing intake. Calcium absorption efficiency is greater if calcium is ingested in divided doses.

The ability of different individuals to utilize the calcium in food may vary considerably. For example, a high protein diet may result in about 15% of the dietary calcium being absorbed, whereas a low protein diet may result in only about 5% of the dietary calcium being absorbed. Moreover, changes in dietary protein in humans alter urinary calcium excretion. Increased protein consumption results in increased calcium excretion (Kerstetter, et al., Am J Clin Nutr 1998; 68:859-865). Certain compounds in food may interfere with calcium absorption. Intestinal factors that influence the absorption of calcium include pH, the calcium:phosphorus ratio, the presence of free fatty acids which occurs when fat absorption is impaired, and the amount of vitamin D. Generally, the more alkaline the contents of the intestines, the less soluble are the calcium salts. Also, a high calcium:phosphorus ratio favors the formation of tricalcium phosphate rather than the more soluble, better absorbed forms. If either calcium or phosphorus is taken in excess, excretion of the other is increased. The optimal ratio is 1:1 when the intake of vitamin D is adequate. Vitamin D promotes the absorption of calcium from the intestine. Calcium citrate has been shown to have two independent mechanisms for calcium absorption, one is vitamin D dependent and one vitamin D independent (Favus and Pak; Am J of Therapeutics 2001; 8:425-431). Many nutritionists believe that the current recommended daily levels of Vitamin $D_3$ (400 IU) are too low and advise higher levels.

Although milk has been a major source of calcium for infants and young children, many teenagers and adult Americans are consuming lesser amounts of it. The calcium content of milk and other beverages can be increased to facilitate meeting the U.S. DRIs for calcium. Calcium enrichment of other foods such as bean curd, yogurt, and cereal grains is disclosed in U.S. Pat. Nos. 4,676,583, 4,784,871, and 4,765,996, respectively.

Calcium compounds have been utilized in baked goods such as crackers, as components of leavening agents, as pH adjusters, in yeast foods, and for its nutritive value. However, calcium-fortified baked goods typically have a dry mouth feel, a dry and hard texture and a very chalky taste as compared to a noncalcium-fortified baked product.

U.S. Pat. No. 5,514,387 is directed to calcium-enriched baked goods and teaches the tenderization of calcium-enriched crackers and other baked goods in which the dough includes an emulsifying amount of at least one poly-oxyethylene sorbitan fatty acid ester and at least one stearoyl lactylate. U.S. Pat. No. 4,196,226 discloses a leavening acid comprising alkali metal aluminum phosphate granules having a calcium rich outer surface for improving flow and dusting properties. U.S. Pat. Nos. 6,495,191 and 6,126,982 disclose wheat flour for mineral-enhanced bakery products having at least an additional 2-20% by weight of dietary minerals.

It would be desirable to have a chewable calcium-enriched baked food product that meets the requirements for a Dietary Supplement that has acceptable mouth feel, appearance, taste, aroma, and texture in which at least one piece of the food product provides the recommended daily DRI of calcium and a Vitamin $D_3$ range of 100-2400 IU.

BRIEF SUMMARY OF THE INVENTION

The present invention is directed to a calcium-enriched chewable baked food product in which at least one piece of the food product provides the recommended daily DRI of calcium. The calcium-enriched baked food product has a mouth feel, texture and taste substantially similar to a non-calcium-enriched baked food product. At least one piece of the food product provide calcium in the range of 100-1500 mg, more preferably one piece of the food product provides calcium in the range of 100-650 mg and most preferably, the amount of calcium in each piece is 500 mg. Each piece of the food product also provides Vitamin $D_3$ in a range of 100-2400 IU.

Optionally, the baked food product can be enrobed with a flavored coating.

The calcium is selected from a group of calcium sources consisting of calcium citrate, calcium gluconate, calcium lactate, calcium carbonate, calcium phosphate and calcium citrate malate. In the food product, less than 100% of the calcium citrate has a particle size less than 100 μm; less than 99% of the calcium citrate has a particle size less than 40 μm; and less than 90% of the calcium citrate has a particle size less than 20 μm. The preferred median particle size is 2-6 μm.

The baked food product is selected from a group consisting of a flavored cake, a brownie, a strudel and other cake-like products, can have a bakery type interior and optionally is enrobed with a flavored coating.

The baked food product has a flavor selected from a group consisting of chocolate, chocolate mint, lemon, caramel, cappuccino, cinnamon, maple, butter, fruit flavors, vanilla, peanut butter, and carrot flavored cake.

The coating has a flavor selected from a group consisting of chocolate, chocolate mint, lemon, caramel cappuccino, cinnamon, maple, butter, fruit flavors, vanilla, yogurt and peanut butter.

Each piece of the unenrobed food product has a weight preferably in the range of 3.5 to 24 grams and each piece of the food product can optionally be completely enrobed with 0.5-8 grams of coating.

The present invention is also directed to a method for producing a calcium-enriched baked food product, the food product being chewable and providing the recommended daily DRI of calcium. The method includes the steps of: a) mixing selected wet and dry ingredients in a mixer to form a mixed dough/batter; b) feeding the mixed dough/batter through an extruder; c) cutting the extruded dough/batter into individual pieces either before or after baking; d) baking the extruded dough/batter; e) enrobing the individual pieces; and f) packing the pieces into any number of packaging configurations such as trays. The method thereby provides a chewable calcium-enriched food product in which at least one piece of the food product provides the recommended daily DRI of calcium and the food product has a mouth feel, texture and taste substantially similar to a non-calcium-enriched baked food product.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
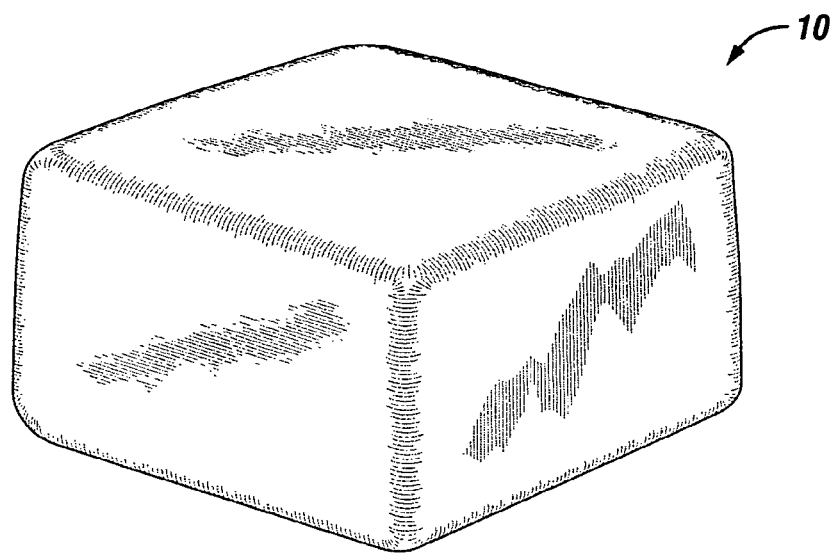
FIG. 1 is a perspective view of inventive food product.

As used herein, the use of the word "a" or "an" when used in conjunction with the term "comprising" in the claims and/or the specification may mean "one," but it is also consistent with the meaning of "one or more," "at least one," and "one or more than one."

Water activity is a measurement of the energy status of the water in a system; represented by a quotient between water's partial pressure in the food and pure water's partial pressure. It indicates how tightly water is bound, structurally or chemically, within a substance. This is measured by equilibrating the liquid phase (in the sample) with the vapor phase (in the headspace) and measuring the relative humidity of that space. A major application of water activity concerns the control of microbial growth. The control of microbial growth is a significant component of food safety. Most pathogenic bacterial growth in food products can be stopped by water activity (aw)≤0.85. To stop yeast and mold growth it is necessary to have aw≤0.75. Moisture is a quantitative analysis to determine the total amount of water present in a sample.

Sources of calcium that is micronized have particles of a very small size, for example less than 100% of the micronized calcium particles are less than 100 μm in size.

Mouthfeel is the mingled experience deriving from the sensations of the mucus membrane in the mouth during and/or after ingestion of a food or beverage. It relates to density, moisture, viscosity, surface tension and other physical properties of the food or beverage being sampled.

A daily intake of about 1000 mg of calcium is the recommended Dietary Reference Intake (DRI) for calcium that meets most peoples needs (19-50 yrs) for general health especially bone health. For older adults (over 50 yrs) and people with osteoporosis the recommend DRI is about 1200 up to 1500 mg of calcium depending upon bone health. The required DRI of calcium in adolescent children (9-18 yrs) and lactating and pregnant women is about 1300 mg daily. The required DRI of calcium for infants 7-12 months is 270 gm daily, for young children 1-3 yrs is 500 gm daily, and children 4-8 is 800 mg daily.

As known to one skilled in the art of food technology, creamy is generally specified as having a combination of moderate to high viscosity, non-Newtonian flow, the presence of some fat and other factors. Foods that are creamy are very smooth and have to be free from gritty, lumpy, grainy or abrasive properties.

Non-calcium enriched baked food products have a soft texture, an acceptable moist mouthfeel, do not have an off-taste, and are free of gritty and grainy properties. Increasing the calcium content of baked food products typically adversely affects the mouthfeel, taste and texture of the baked food product, resulting in a food product that has a dry mouthfeel, a caulky taste and a hard texture.

In the present invention, it has been found that the calcium content of the chewable food product can be increased by the use of a micronized calcium source. The use of micronized calcium, preferably calcium citrate, results in a baked food product that has an acceptable moist mouthfeel, a soft texture and a taste that is comparable to a non-calcium-enriched baked food product.

Figure 2:
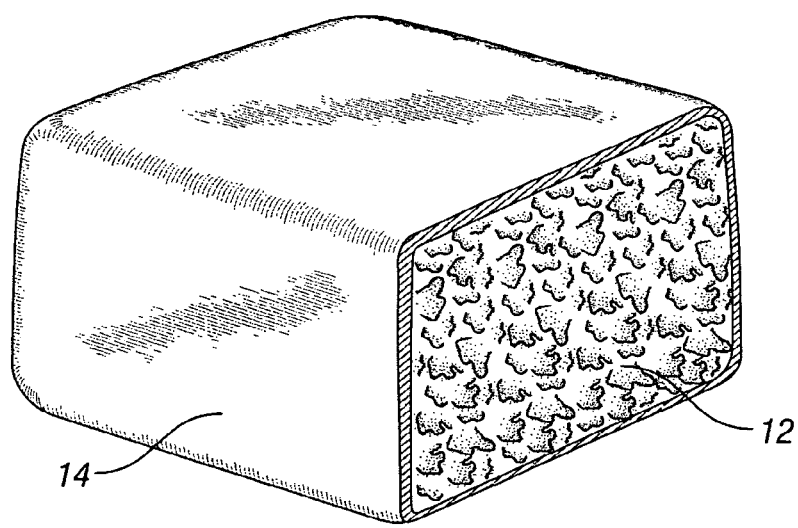
FIG. 2 is a perspective view of the food product of FIG. 1 showing the interior of the food product.

Baked food product 10 of the present invention can include for example a flavored cake, a brownie, or a strudel or other cake-like product (FIG. 1). The baked food product preferably has a bakery-type interior and an optional exterior coating. Preferably, the mouthfeel is creamy and smooth. In a preferred embodiment, the chewable calcium citrate food product 10 is a flavored cake 12 optionally enrobed in a flavored coating 14 (FIG. 2). The product also contains Vitamin $D_3$. Any flavoring can be used for the cake and coating. Some examples of flavorings can be selected from flavors such as chocolate, chocolate mint, lemon, caramel, cappuccino, cinnamon, maple, butter, fruit flavors, vanilla, peanut butter, and a carrot flavored cake with an appropriate coating.

Preferably, the calcium source is "calcium citrate tetrahydrate, USP Ultra Fine" from suppliers such as Jost Chemical Co, Inc. St. Louis, Mo.; Jungbunzlauer Ladenburg GmbH, Ladenburg; or Boehringer Ingelheim GmbH, Ingelheim Germany. In a preferred embodiment, less than 100% of the calcium source has a particle size less than 100 µm. In a more preferred embodiment, less than 99% of the calcium source has a particle size below 40 µm. In a most preferred embodiment, less than 90% of the calcium source has a particle size below 20 µm, with a median particle size between 2-6 µm. Other sources of calcium such as calcium gluconate, calcium lactate, calcium carbonate, and calcium citrate malate can be used as well as other known calcium sources. Preferably, the calcium sources have a lead level that is less than 0.10µ per one gram of calcium source and more preferably less than 0.020µ per one gram of calcium source.

Each unenrobed chewable piece can be formed into various sizes and weights. Examples of different sizes and weights are shown in the table below with the respective amount of calcium, Vitamin $D_3$, and calories for each.

and palm oils and soybean oil, corn syrup, whey, natural and artificial flavors, cocoa, xanthan gum, glycerol, soy lecithin, artificial colors, sodium benzoate, phosphoric acid, potassium sorbate, salt, and Vitamin $D_3$. The baked food product can optionally be enrobed with a flavored coating.

The chewable food product 10 of the present invention has an extended shelf-life, preferably a shelf-life of 18-24 months. This is achieved by reducing both the oxygen level and the water activity of the product. Preferably, the oxygen level is as low as possible without producing changes to the flavor or appearance of the product. The deterioration of foods by microorganisms can take place rapidly during storage. Moisture content is an important factor in controlling the rate of deterioration in food products. It is the availability of water for microbial activity that determines the shelf-life of a food and this is measured by the water activity of a food. Thus, it is desirable that the water activity of the chewable food product be less than 0.8 and preferably less than 0.75. Therefore, a low oxygen level and a water activity level less than 0.8 provides for a fresh tasting and stable product that will remain for the product's shelf-life of 18-24 months.

| Weight | Elemental Calcium | % Elemental Calcium | Vitamin $D_3$ | Calories | Size |
|---|---|---|---|---|---|
| 3.5 grams +/− 5% | 100-500 mg, preferably 250 mg | 2.86-14.29% preferably 7.14% | 100-600 IU | 14-16 | ⅜" length, ⅞" width, ⅔" height |
| 9 grams +/− 3% | 100-650 mg, preferably 500 mg | 1.11-7.22% preferably 5.56% | 200-1200 IU | 35-40 | ⅞" length, ⅞" width, ⅔" height |
| 18 grams +/− 3% | 500-1200 mg, preferably 1000 mg | 2.78-6.67% preferably 5.56% | 400-2400 IU | 70-80 | 1¾" length, ⅞" width, ⅔" height |
| 24 grams +/− 3% | 500-1500 mg, preferably 1300 mg | 2.08-6.25% preferably 5.42% | 400-2400 IU | 90-110 | 2⅓" length, ⅞" width, ⅔" height |

The chewable food product has a moisture content of 13-15%, preferably 14%, and a water activity of less than 0.8, preferably less than 0.75. The enrobed food product can have the following amount of coating: 3.5 gm piece can have about 0.5-2 gm of coating, preferably 1 gm; 9 gm piece can have about 1.5-4 gm of coating, preferably 2 gm; 18 gm piece can have about 3-6 gm of coating, preferably 4 gm; and the 24 gm piece can have about 4-8 gm of coating, preferably 5.5 gm.

At least one piece of the chewable food product can provide the recommended daily DRI of calcium depending upon the age of the person and the size of the food product. The chewable food product also has no trans fat, a low lead level and is low in carbohydrates. The amount of calcium in each piece will depend upon the size of the chewable piece or the size can be kept constant and the amount of calcium varied. For example, a piece weighing 3.5-9 grams can provide calcium in the range of 100-650 mg (1.11%-18.57% calcium by weight). Two 9 gram pieces having 500 mg calcium each (5.56% calcium by weight each), can provide a daily DRI of 1000 mg of calcium. Therefore, the number of pieces that will meet the recommended daily DRI for calcium will depend upon the size and weight of the chewable piece. However, calcium absorption efficiency is greater if calcium is ingested in divided doses.

Figure 3:
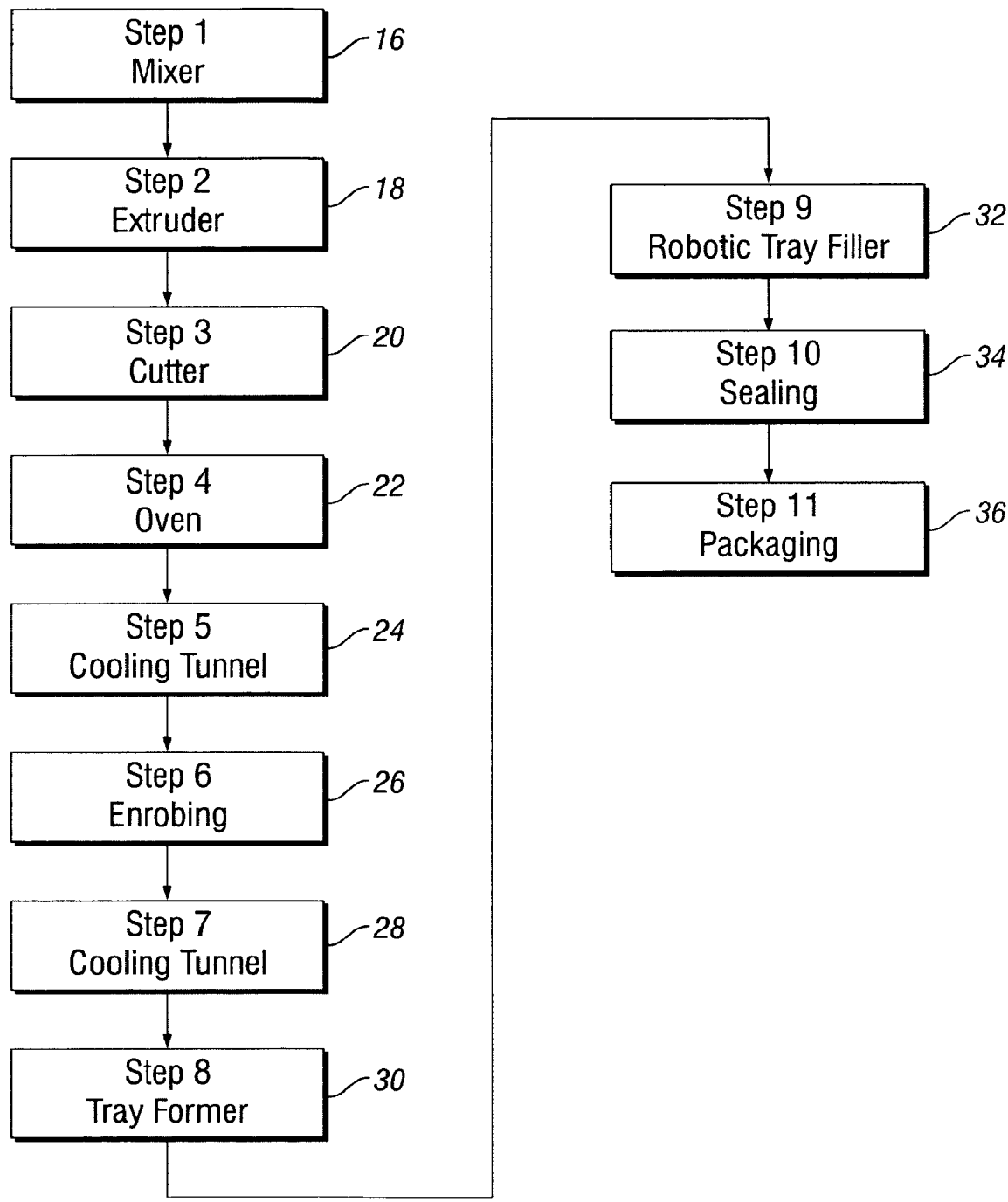
FIG. 3 is a flow chart of the process steps for producing the inventive food product.

The ingredients in the baked food product can include for example, sugar, calcium citrate, enriched bleached flour (niacin, reduced iron, thiamine mononitrate, riboflavin, folic acid), egg, oils such as partially hydrogenated palm kernel As illustrated in the flow chart of FIG. 3, the chewable food product of the present invention is formed by mixing the dry ingredients and wet ingredients in a mixer 16. In a preferred embodiment, a vertical mixer is used. Mixing is timed to ensure content uniformity of all ingredients, especially the active ingredients. The mixed dough/batter is fed through an extruder 18, such as a twin screw extruder. In a preferred embodiment, a ve-mag extruder is used because of the need to minimize the entrapped air in the food product. This is because entrapped air will cause weight variation of the food product and in order for food products to be suitable as a dietary supplement, certain weight tolerances need to be met. In a most preferred embodiment, the ve-mag extruder has a vacuum chamber to keep the extruder head filled at a constant level and to provide positive pressure to the twin extruder.

The extruded dough/batter is cut 20 into pieces at pre-baking or post-baking, preferably pre-baking. The food product is preferably cut with a double reciprocating guillotine. If the food product is cut pre-bake, then after cutting the product is baked. If the food product is cut post-bake, the product is baked and then cut. One can optimize the dough consistency for ease of extrusion. Changing the timing of the guillotine cutting and the conveyor speed will result in a food product of varying concentration of the calcium and Vitamin $D_3$. Alternatively, the amount of calcium and Vitamin $D_3$ in the dough mixture can be varied and the food product size kept constant. This allows for a customization of the food product to meet the varying recommended daily DRIs for calcium.

The extruded product is baked 22 at a temperature range of 225-275° F., for thirteen to fifteen minutes, preferably thirteen minutes, with heating sources known to one skilled in the art of baking. In a preferred embodiment, the heat source is a combination of 10-20% convection and 80-90% radiant heat, with a preferred combination of 10% convection and 90% radiant. The time and temperature of baking are adjusted in accordance with conventional techniques, to provide a shelf-stable moisture content.

After baking, the product is cooled in a cooling tunnel 24 to the ambient temperature of the process room. The immediate cooling minimizes degradation of the Vitamin $D_3$. Thereafter, each piece can be enrobed 26 with a coating using a standard confectionary enrober known to one skilled in the art of food production. In a preferred embodiment, each piece is completely enrobed with a coating. For example the 3.5 gm piece can have about 0.5-2 gm of coating, preferably 1 gm; the 9 gm piece can have about 1.5-4 gm of coating, preferably 2 gm; the 18 gm piece can have about 3-6 gm of coating, preferably 4 gm; and the 24 gm piece can have about 4-8 gm of coating, preferably 5.5 gm. The invention provides a delivery system for vitamins such as Vitamin A, the Vitamin B group, Vitamin C, D and K; minerals such as magnesium, manganese, zinc, magnesium, iron, and phosphorus; and functional ingredients such as antioxidant and other related compounds; flavor masking agents; and microencapsulated active compounds. This is not an exclusive list of contemplated vitamins, minerals and functional ingredients. The coating totally encapsulates each piece substantially protecting the Vitamin $D_3$ and other labile vitamins and ingredients from light and certain oxygen sources that can cause degradation. Once the product is enrobed it travels again through a cooling tunnel 28 in order to set the coating.

One skilled in the art of food technology knows that the contemplated shipping conditions of an enrobed food product will impact the choice of the enrobing material. Generally, if a low melt point enrobing material in the range of 102-110° F. is used, the enrobed food product will require refrigerated or controlled cool shipping conditions. Alternatively, if a high melt point enrobing material in the range of 110-130° F. is used, the enrobed food material can be shipped under non-refrigerated conditions and will withstand adverse environmental conditions in most places. In a preferred embodiment, a high melt point enrobing material having a melt point of 117° F. can be used in order to prevent the coating from melting during most shipping conditions. The enrobing material can be obtained from sources such as Guittard Chocolate Company, Burlingame, Calif.; AMD, Decatur, Ill. or Clasen Quality Coating, Inc., Madison, Wis.

After the coating has set, the product may be transferred to a packing area via conveyors or by moving manually. A standard horizontal form, fill and seal machine is used. In a preferred embodiment, a high barrier laminated film structure is thermo-formed into "blister" cavity trays 30 and a robotic pick and place system 32 fills the trays with the chewable food product. The filled trays pass into a sealing station 34 where the atmosphere is modified to remove oxygen from the headspace of the tray cavity and replace it with inert gas. In a preferred embodiment, the inert gas is composed of 0-20% carbon dioxide and 80-100% nitrogen. The trays are hermetically sealed with a foil laminate film having certain barrier properties. In a preferred embodiment, the foil laminate film has an Oxygen Transmission Rate of 0.019-0.026 cc/(100 in day) and a Water Vapor Transmission Rate of 0.068, +/3% gm/(100 $in^2$ day). The product is thereafter loaded into a variety of retail packaging configurations 36.

Figure 4:
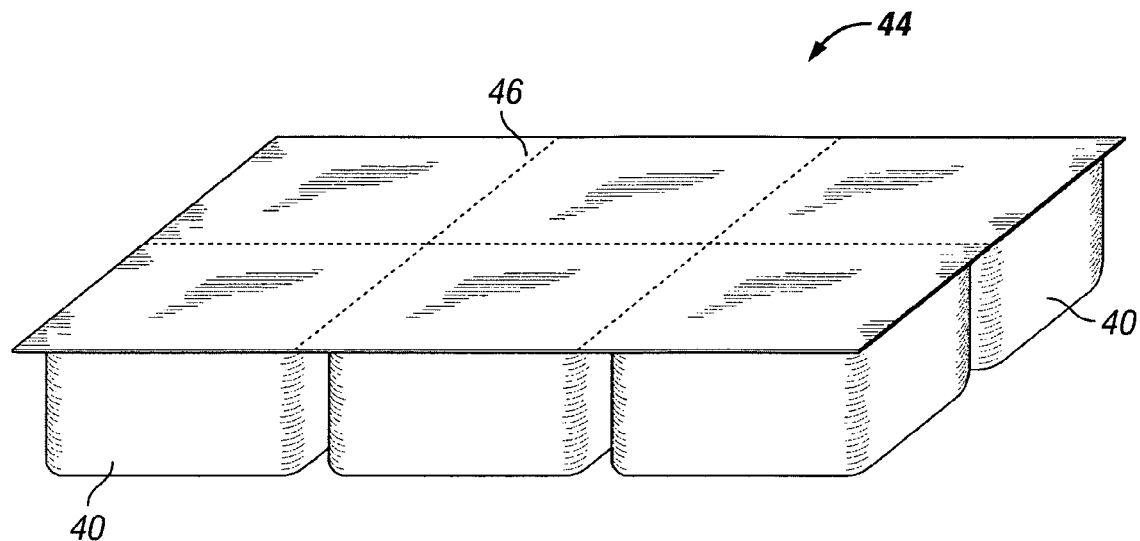
FIG. 4 is a perspective view of packaging for a single serving of the food product of FIG. 1.
Figure 5:
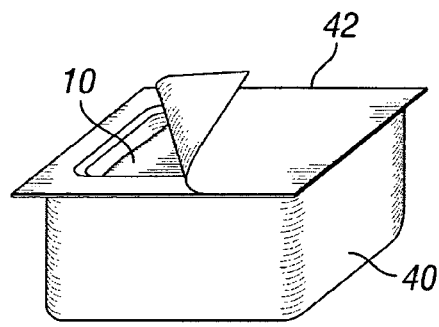
FIG. 5 is a perspective view of an embodiment of a multi-pack formed from the packaging of FIG. 4.

In one example of the packaging 38, the each piece of the food product 10 is placed in an individual tray 40 having a foil laminate film 42 (FIG. 4). The trays 40 can be configured in a pack 44 consisting of two rows of three trays each in which the edges of the trays 40 have perforations 46 for easy separation (FIG. 5).

It is understood that all processing steps can be performed manually with out the need for mixers, extruders, cutters, cooling tunnels or automated packaging devices.

The present invention is further illustrated in the following examples, where all parts, ratios and percentages are by weight, and all temperatures are in ° F., unless otherwise stated:

EXAMPLE 1

One example is a 9 gram sized brownie that is dipped in a chocolate flavored coating. The ingredients and their relative amounts may be used to produce a calcium enriched brownie that provides about 500 mg calcium and about 200 IU of Vitamin $D_3$.

| Brownie Ingredients | w/w % |
|---|---|
| Powder sugar | 27-30% |
| Cake flour | 11-14% |
| Whole eggs dried | 1-4% |
| Corn starch | .3-1.3% |
| Nonfat dry milk | .9-2.5% |
| Cocoa powder | .5-2.5% |
| Xanthan gum | .25-.4% |
| Salt | .5-1.5% |
| Calcium Citrate | 26.6-28.6% |
| Potassium Sorbate | .075-.15% |
| Water | 6-9% |
| Corn syrup | 2.5-4% |
| Glycerol | .5-1.5% |
| Soybean oil | 6-9% |
| Vanilla extract | .15-.7% |
| Chocolate extract | 1.5-3.5% |
| Brown color | .009-.015% |
| Coffee emulsion | .002-.01% |
| Vitamin $D_3$ (100,000 IU/G) | .029-.035% |

The dry and wet ingredients for the brownie are mixed in a vertical mixer and the mixed batter is fed through a ve-mag extruder. The extruded product is cut and then baked with a combination of 10% convection and 90% radiant heat for thirteen minutes and at 225-275° F. or after baking the product is cut. Regardless of when the cutting takes place, the food product is cut into pieces with a double reciprocating guillotine. Thereafter, the product is cooled to the ambient temperature of the process room.

Each piece is enrobed with about 2 grams of a chocolate flavored coating using a standard chocolate enrober set up. Once the pieces are enrobed they travel through a cooling tunnel in order to set the coating. After the coating has set, the pieces are transferred to a packing area for packaging into "blister" cavity trays. The filled trays are hermetically sealed with a foil laminate film. The filled trays are thereafter loaded into a variety of retail packaging configurations.

EXAMPLE 2

Another example is a 9 gram piece of lemon flavored cake dipped in a lemon flavored coating. The ingredients and their relative amounts may be used to produce a calcium enriched cake that provides about 500 mg calcium and about 200 IU of Vitamin $D_3$.

| Cake Ingredients | w/w % |
|---|---|
| Powder sugar | 29-32% |
| Cake flour | 13-16% |
| Whole eggs dried | 1.5-3.0% |
| Corn starch | .2-1% |
| Nonfat dry milk | .5-2.5% |
| Xanthan gum | .2-.65% |
| Salt | .5-1.5% |
| Calcium Citrate | 26.6-28.6% |
| Potassium Sorbate | .06-1.1% |
| Corn syrup | 2-4% |
| Glycerol | .8-2% |
| Soybean oil | 6-9% |
| Water | 6-9% |
| Vanilla extract | .2-1.1% |
| Yellow color | .003-.009% |
| Lemon extract, concentrated | .3-1.2% |
| Vitamin $D_3$ (100,000 IU/G) | .029-.035% |

The dry and wet ingredients for the cake are mixed in a vertical mixer and the mixed batter is fed through a ve-mag extruder. The extruded product is cut and then baked with a combination of 10% convection and 90% radiant heat for thirteen minutes and at 225-275° F. or after baking the product is cut. Regardless of when the cutting takes place, the food product is cut into pieces with a double reciprocating guillotine. Thereafter, the product is cooled to the ambient temperature of the process room.

Each piece is enrobed with about 2 grams of a lemon flavored coating using a standard enrober set up. Once the pieces are enrobed they travel through a cooling tunnel in order to set the coating. After the coating has set, the pieces are transferred to a packing area for packaging into "blister" cavity trays. The filled trays are hermetically sealed with a foil laminate film. The filled trays are thereafter loaded into a variety of retail packaging configurations.

EXAMPLE 3

Another example is a 9 gram piece of caramel flavored cake dipped in a caramel flavored coating. The ingredients and their relative amounts may be used to produce a calcium enriched cake that provides about 500 mg calcium and about 200 IU of Vitamin $D_3$.

| Cake Ingredients | w/w % |
|---|---|
| Powder sugar | 28-32% |
| Cake flour | 13-16% |
| Whole eggs dried | 1.5-3% |
| Corn starch | .3-1.1% |
| Nonfat dry milk | .8-2.2% |
| Xanthan gum | .1-.5% |
| Salt | .5-1.5% |
| Calcium Citrate | 26.6-28.6% |
| Potassium Sorbate | .08-.13% |
| Corn syrup | 1.9-3.5% |
| Glycerol | .75-1.5% |
| Soybean oil | 6-9% |
| Water | 7-9% |
| Vanilla extract | .1-1.3% |
| Yellow color | .008-.012% |
| Caramel flavor | 1-3% |
| Caramel color | .01-.09% |
| Vitamin $D_3$ (100,000 IU/G) | .029-.035% |

The dry and wet ingredients for the cake are mixed in a vertical mixer and the mixed batter is fed through a ve-mag extruder. The extruded product is cut and then baked with a combination of 10% convection and 90% radiant heat for thirteen minutes and at 225-275° F. or after baking the product is cut. Regardless of when the cutting takes place, the food product is cut into pieces with a double reciprocating guillotine. Thereafter, the product is cooled to the ambient temperature of the process room.

Each piece is enrobed with about 2 grams of a caramel flavored coating using a standard enrober set up. Once the pieces are enrobed they travel through a cooling tunnel in order to set the coating. After the coating has set, the pieces are transferred to a packing area for packaging into "blister" cavity trays. The filled trays are hermetically sealed with a foil laminate film. The filled trays are thereafter loaded into a variety of retail packaging configurations.

EXAMPLE 4

Another example is a 9 gram piece of chocolate mint flavored cake dipped in a chocolate mint flavored coating. The ingredients and their relative amounts may be used to produce a calcium enriched cake that provides about 500 mg calcium and about 200 IU of Vitamin $D_3$.

| Cake Ingredients | w/w % |
|---|---|
| Powder sugar | 26-29% |
| Cake flour | 11-14% |
| Whole eggs dried | 1.5-3% |
| Corn starch | .3-1.1% |
| Nonfat dry milk | .9-2.5% |
| Cocoa powder | .9-2.5% |
| Xanthan gum | .1-.6% |
| Salt | .6-1.3% |
| Calcium Citrate | 26.6-28.6% |
| Potassium Sorbate | .09-.13% |
| Water | 5-8% |
| Corn syrup | 2.5-3.9% |
| Glycerol | .75-2% |
| Soybean oil | 6-9% |
| Vanilla extract | .1-1.5% |
| Mint flavor | 2-4% |
| Vitamin $D_3$ (100,000 IU/G) | .029-.035% |

The dry and wet ingredients for the cake are mixed in a vertical mixer and the mixed batter is fed through a ve-mag extruder. The extruded product is cut and then baked with a combination of 10% convection and 90% radiant heat for thirteen minutes and at 225-275° F. or after baking the product is cut. Regardless of when the cutting takes place, the food product is cut into pieces with a double reciprocating guillotine. Thereafter, the product is cooled to the ambient temperature of the process room.

Each piece is enrobed with about 2 grams of a chocolate mint flavored coating using a standard enrober set up. Once the pieces are enrobed they travel through a cooling tunnel in order to set the coating. After the coating has set, the pieces are transferred to a packing area for packaging into "blister" cavity trays. The filled trays are hermetically sealed with a foil laminate film. The filled trays are thereafter loaded into a variety of retail packaging configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for producing a calcium-enriched baked food product comprising the steps of:
   a) mixing selected wet and dry ingredients in a mixer to form a mixed dough/batter, wherein the selected ingredients comprise a source of calcium;
   b) feeding the mixed dough/batter through an extruder;
   c) cutting the extruded dough/batter into individual pieces either before or after baking; and
   d) packing the baked pieces into packing material thereby providing a chewable calcium-enriched food product wherein the food product has a mouth feel, texture and taste substantially similar to a non-calcium-enriched baked food product;

wherein the calcium enriched food product provides a source of calcium and the source of calcium is calcium citrate with a median particle size between 3 μm and 6 μm;

wherein the calcium enriched food product comprises between 2.30% and 18.57% elemental calcium;

wherein the calcium-enriched food product provides Vitamin D3 in a range of 100-2400 IU;

wherein the calcium-enriched food product has a moisture content of 13%-15% by weight; and, wherein the calcium-enriched food product has a water activity of less than 0.8.

2. The method of claim 1, further including the step of completely enrobing the individual pieces with an exterior coating prior to packing the pieces into at least one tray.

3. The method of claim 1, further including the step of completing the baking process of the extruded dough/batter after it is cut.

4. The method of claim 1, wherein at least one tray is a blister cavity tray that is hermetically sealed after filling.

5. The method of claim 1, wherein the at least one piece of the food product provide calcium the range of 100-1500 mg.

6. The method of claim 5, wherein one piece of the food product provides calcium in the range of 100-650 mg.

7. The method of claim 6, wherein the calcium is about 500 mg.

8. The method of claim 1, wherein each piece of the food product provides Vitamin $D_3$ in a range of 200-1200 IU.

9. The method of claim 1, wherein less than 100% of the calcium source has a particle size less than 100 μm.

10. The method of claim 9, wherein less than 99% of the calcium source has a particle size less than 40 μm.

11. The method of claim 10, wherein less than 90% of the calcium source has a particle size less than 20 μm.

12. The method of claim 1, wherein the food product is selected from a group consisting of a flavored cake, a brownie, and a strudel.

13. The method of claim 12, wherein the food product is enrobed with a flavored coating.

14. The method of claim 12, wherein the food product has a flavor selected from a group consisting of chocolate, chocolate mint, lemon, caramel, cappuccino, cinnamon, maple, butter, fruit flavors, vanilla, peanut butter, and carrot flavored cake.

15. The method of claim 13, wherein the coating has a flavor selected from a group consisting of chocolate, chocolate mint, lemon, caramel, cappuccino, cinnamon, maple, butter, fruit flavors, vanilla, and peanut butter.

16. The method of claim 1, wherein each piece of food product has a weight in the range of 3.5 to 24 grams.

17. The method of claim 1, wherein each piece of the food product is completely enrobed with 0.5-8 grams of coating.

18. The method of claim 1, wherein the food product has an extended shelf-life of 1-26 months.

19. The method of claim 1, wherein the calcium enriched food product comprises between 5.56% and 18.57% elemental calcium.

* * * * *